United States Patent

[11] 3,607,555

| [72] | Inventors | Jean Leblond;<br>Jean Biet, both of Compiegne, Oise, France |
|---|---|---|
| [21] | Appl. No. | 758,788 |
| [22] | Filed | Sept. 10, 1968 |
| [45] | Patented | Sept. 21, 1971 |
| [73] | Assignee | Uniroyal Englebert France S.A.<br>Paris, France |
| [32] | Priority | Sept. 17, 1967 |
| [33] | | France |
| [31] | | 121393 |

[54] MULTIPLE WORK STATION TIRE BUILDING MACHINE
11 Claims, 2 Drawing Figs.

| [52] | U.S. Cl. | 156/396,<br>156/406 |
|---|---|---|
| [51] | Int. Cl. | B29h 17/20,<br>B29h 17/26 |
| [50] | Field of Search | 156/126,<br>127, 394, 396, 405, 406 |

[56] References Cited
UNITED STATES PATENTS

| 2,988,131 | 6/1961 | Frohlich et al. | 156/405 |
|---|---|---|---|
| 3,125,482 | 3/1964 | Niclas et al. | 156/394 UX |
| 3,142,603 | 7/1964 | Parshall et al. | 156/405 |

Primary Examiner—Benjamin A. Borchelt
Assistant Examiner—Stephen C. Bentley
Attorney—Henry Sternberg ABSTRACT: A tire-building machine, having a feed mechanism for supplying a continuous strip of breaker material, a severing device which severs the strip into strip portions, a transfer mechanism for transporting the severed strip portions to a given location at which there is positioned a breaker building drum and including an arrangement for applying to the building drum at said location the severed strip portions in alternatingly opposed orientation, a tire carcass support and shaping member spaced from the building drum, a transport mechanism for transporting tire tread material toward the breaker building drum positioned at said given location and for there applying the tread material to an annular breaker built up thereon, and a transfer ring for transferring a completed breaker-tread assembly from the building drum onto a carcass supported on the shaping member.

INVENTORS
JEAN LEBLOND
JEAN BIET
Henry Sternberg
ATTORNEY

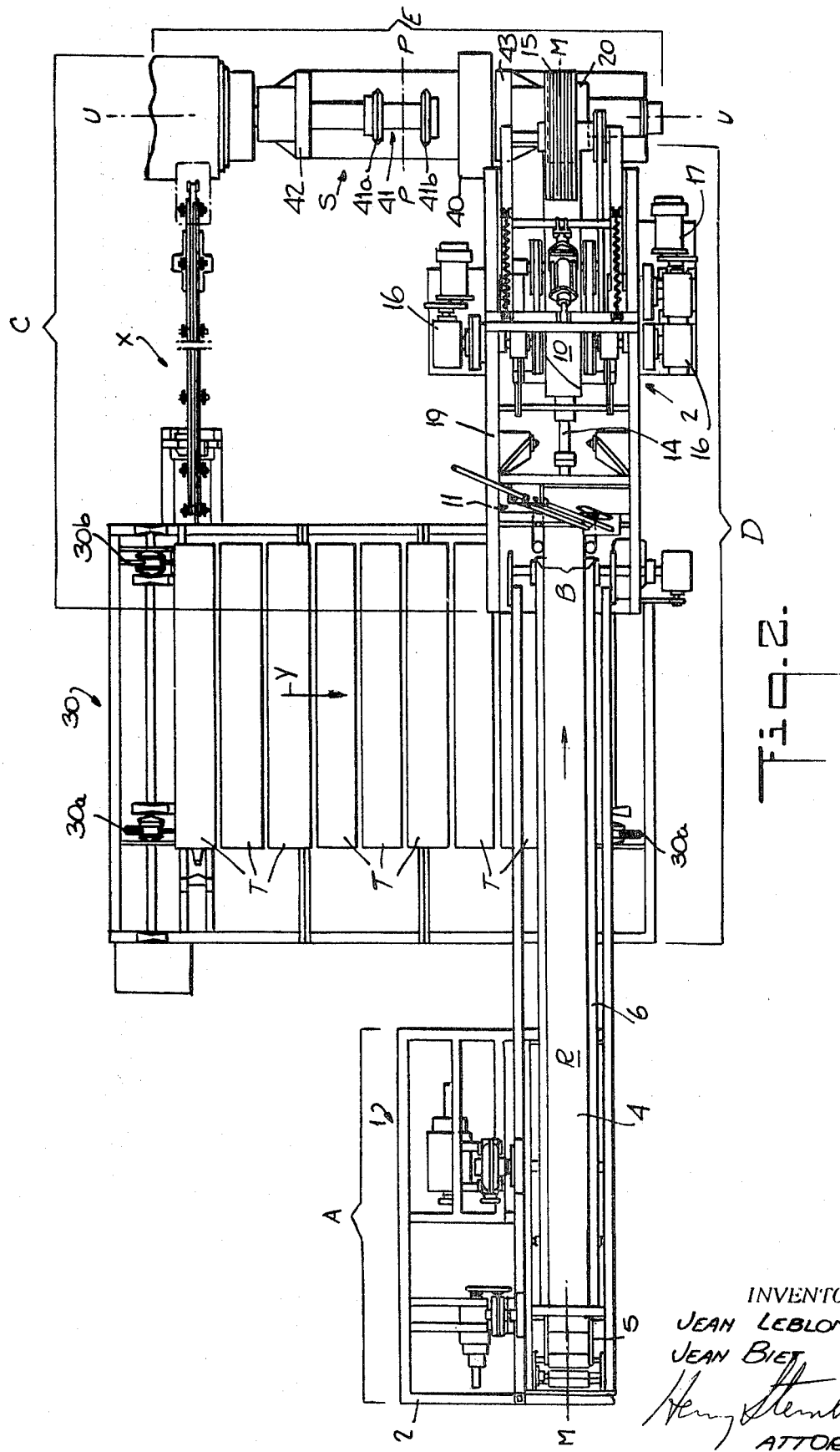

MULTIPLE WORK STATION TIRE BUILDING MACHINE

BACKGROUND OF THE INVENTION

This invention relates to an improved tire-building machine and, more particularly, to a tire-building machine having an improved combination of mechanisms for fabricating breaker plies, assembling such plies into annular breakers, applying tread material around such breaker assembly, and assembling the resulting breaker-tread assembly with a tire carcass.

In the building of tires having breakers or belts incorporated in the crown area of the tire, as in the case of radial ply, belted tires for example, a two stage process is conventionally employed. During the first stage of building, a cylindrical carcass is formed having (1) one or more rubber covered cord plies wound around and interconnecting axially spaced, parallel, coaxial, bead cores an (2) a layer of rubber sidewall stock on each sidewall area of the carcass, intermediate the eventual crown area thereof and the two bead areas thereof. Such a carcass is referred to herein as the "first-stage carcass." During the second stage of building, the shape of the first stage carcass is changed from a cylinder to a toroid and one or more rubber covered cord breaker plies and a rubber tread slab are added to the crown portion of the carcass to form what is referred to herein as the "second stage carcass." The term "rubber" as used herein is intended to cover natural rubber, manmade rubber and rubbery materials. The term "cord" as used herein is intended to cover single strands and multiple strands, filaments, wires or cables of natural and synthetic textile materials such as cotton, rayon, nylon, polyester, glass fiber, and the like, metal and/or such other materials as may be used as reinforcements in pneumatic tires.

A number of machines have heretofore been developed which are utilized in building second stage carcasses in accordance with the general process referred to above (see, e.g., U.S. Pat. No. 3,125,482 to W. Niclas et al., dated Mar. 17, 1964). In these machines, typically the cylindrical shape of the first stage carcass is changed into the toroidal shape of the second stage carcass on an inflatable drum; breaker-tread assemblies are fabricated by successively winding the various plies of each breaker and the tread layer about a radially expansible and contractable auxiliary building drum; each breaker-tread assembly is then transferred from the outer surface of the auxiliary drum to the inner surface of a radially expansible and contractable transfer ring which is brought into a position surrounding the breaker-tread assembly; the breaker-tread assembly building drum is then contracted to allow movement of the transfer ring, with the breaker-tread assembly therein, to a position surrounding a carcass on the inflatable drum; the inflatable drum is then expanded and the crown area of the carcass thereon expands into pressurized contact with, and adheres to, the inner surface of the breaker-tread assembly to form the second stage carcass.

Although commercially acceptable tires can be made on the aforesaid known tire machines, the construction of the known apparatus for carrying out the above process is such that many of the operations are carried out sequentially rather than simultaneously resulting in loss of valuable machine time. Furthermore, layout of the known machines is such as to result, among other things, in an inefficient use of factory space. The sequentiality of the operation and/or the application by hand of the breaker plies and tread to the building drum increases the possibility of error in alignment of the components of the workpiece, thus frequently resulting in a lack of uniformity of the tires produced by such machines.

Accordingly, the primary objective of the present invention is to obviate the foregoing disadvantages by providing an improved tire building machine.

Another object of this invention is to provide a tire-building machine having a higher production rate than the presently known tire-building machines.

A further object of this invention is to provide a tire building machine capable of more uniformity in the tires built thereon.

Yet another object of this invention is to provide a tire-building machine requiring a minimum amount of factory space.

Further objects and advantages of this invention will become apparent as the following description proceeds.

SUMMARY OF THE INVENTION

Briefly stated and in accordance with one embodiment of this invention, a tire building machine is provided with supply means for supplying a continuous strip of bias-cut breaker material, with severing means for severing strip portions from the continuous strip of breaker material, with a building drum for rotation at a given location spaced from the severing means, with breaker transfer means cooperating with such building drum at the given location for applying the severed strip portions thereto in such a manner as to from on the periphery of the building drum an annular breaker having at least one pair of plies. The apparatus further includes tread applicator means cooperating with the building drum at said given location for applying a strip of tread material therearound so as to form an annular breaker-tread assembly thereon, carcass support means spaced from the given location of the building drum said adapted to support a tire carcass, breaker-tread transfer means shiftable between the building drum and the carcass support means for shifting a completed breaker-tread assembly from the building drum to a position surrounding a carcass on the carcass support means, and means associated with said carcass support means for assembling together the carcass and the breaker-tread assembly.

BRIEF DESCRIPTION OF THE DRAWING

While the specification concludes with claims particularly pointing out and distinctly claiming the subject matter regarded as this invention, it is believed that the invention will be better understood from the following description, taken in connection with the accompanying drawings in which:

FIG. 2 is a plan view of the machine shown in FIG. 1.

DESCRIPTION OF THE PREFERRED EMBODIMENT

Figure 1:
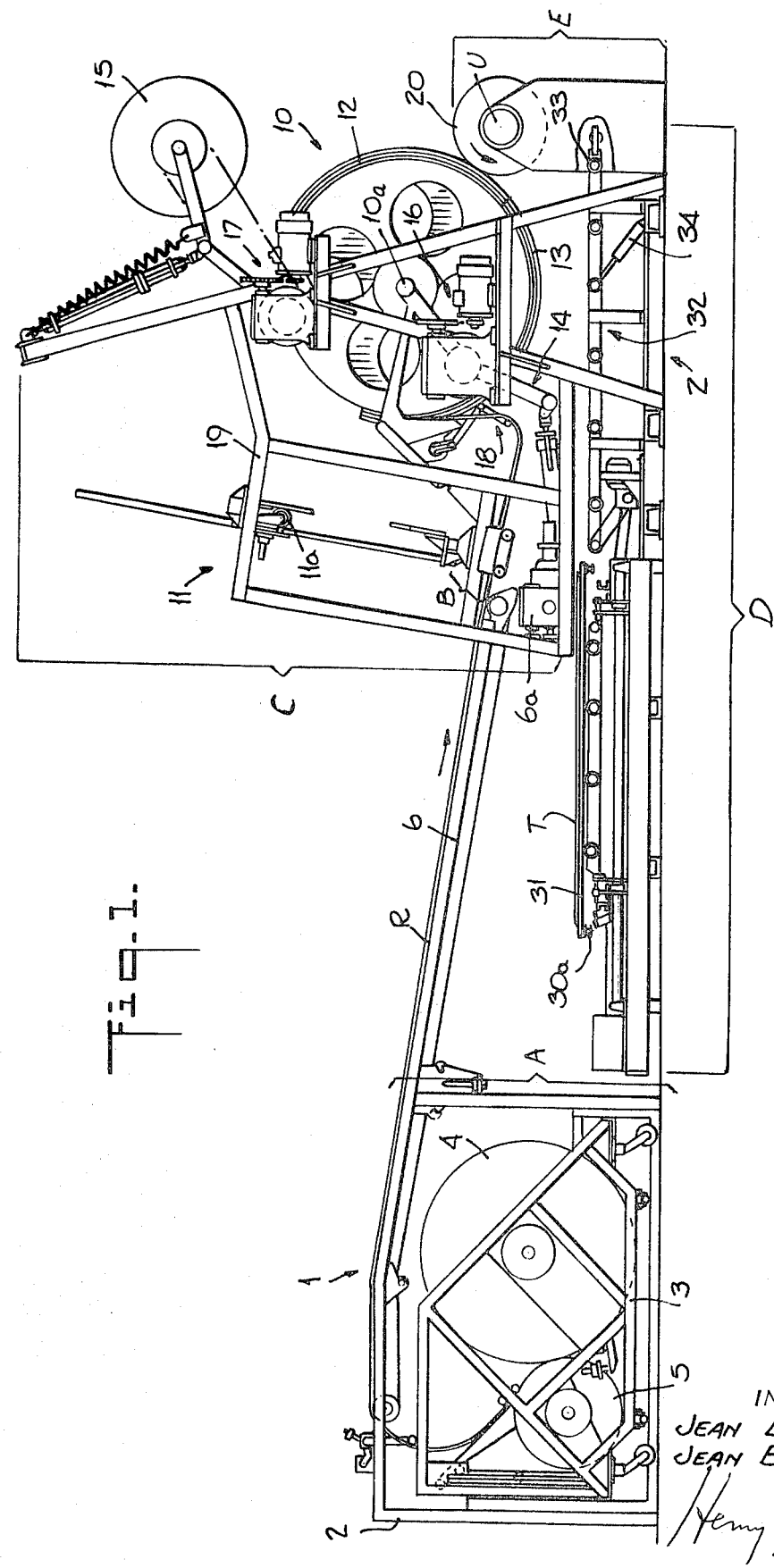
FIG. 1 is a front elevational schematic view of a tire-building machine embodying the present invention.

Referring to FIGS. 1 and 2, the apparatus according to the invention includes a supply unit "A" for supplying a continuous strip R of magnetically attractable breaker material. Strip supply unit "A" is preferably of the type described in the U.S. Pat. No. 3,498,555, issued Mar. 3, 1970.

As described in the aforesaid patent application, the supply unit "A" includes an unwinding station 1 defined by a stationary frame 2 on which the drive and control elements of the unit are mounted, and a movable dolly 3 on which is mounted a breaker strip supply spool 4 and a liner windup spool 5. While the liner which separates adjacent convolutions of the breaker material is wound on spool 5, the continuous strip of breaker material R is fed to a conveyor 6 which transports the continuous strip material R along a given path toward a unit "C" which fabricates breaker plies, orients the breaker plies in desired fashion, transfers the oriented breakers to a building unit "E" and, as will be described in more detail hereinbelow, applies the breakers to a breaker building drum 20 of the unit "E."

Adjacent the downstream end of the conveyor 6, which latter may be an endless belt conveyor of well-known type, there is preferably located a breaker strip centering device (Unit "B") such as the one described in copending U.S. Pat. Application, Ser. No. 644,175 filed on June 7, 1967, by J. Leblond, now Pat. No. 3,473,422. Strip centering unit "B" preferably includes a pair of endless belts forming a generally horizontal, moving support surface for supporting the strip material as it passes through the device, and a pair of driven endless belts forming vertical, horizontally spaced, moving surfaces for contacting and guiding the side edges of the strip material as it passes through the device so as to maintain the continuous strip R in registry with the unit C.

The breaker fabricating, orienting and transfer unit "C," is located in the region of the downstream end of unit "B" and includes a segmented breaker transfer drum 10. Unit "C" is preferably of the type described in copending U.S. Pat. Application No. 749,810 filed by J. Leblond on Aug. 2, 1968. Unit "C" preferably also includes a severing means 11 having a rotary cutter 11a movable upwardly and downwardly along an inclined path. Severing means 11 is spaced from the fixed horizontal axis of the breaker building drum 20, to be described below, and it is in the space between the severing means 11 and the drum 20 that the drum 10 is located.

Drum 10 includes a pair of segmental portions 12 and 13 of a common cylinder supported for rotation about a common axis 10a and adapted to support the end portion of the continuous strip R. The drum 10 is laterally shiftable in generally horizontal direction, by an actuating means 14, between a rear position in which the drum 10 is adjacent to the severing means 11, an intermediate position in which the drum 10 is spaced from both the severing means 11 and the drum 20, and a final, breaker applicating, position in which the drum 10 is in tangential contact with the drum 20 (FIG. 1). Unit "C" also includes an intermediate transfer drum 15 supported for generally vertical movement, between a position remote from the building drum 20 (FIG. 1), an intermediate position in which drum 15 is in tangential contact with the drum 10 when the latter is in its intermediate position, and a breaker applicating position in which drum 15 is in tangential contact with the building drum 20.

The severing means 11 cooperates with the drum 10 for severing the continuous strip R thereon into successive strip portions, respectively, for the inner and outer of a pair of breaker plies built up on drum 20 in the form of an annular breaker. The arrangement is such that alternate ones of the severed portions of strip material are applied to the building drum 20 directly by the corresponding segmental portion of the main transfer drum 10, while the remaining ones of the severed portions of strip material R are applied first to the intermediate transfer drum 15 by the remaining segmental portion of drum 10 and are only thereafter applied by the transfer drum 15 to the building drum 20. In this way pairs of annular breaker plies are built up on the building drum 20 with the cords of one ply in each pair forming a crossing angle to the cords of the second ply in each pair.

A drive mans 16, preferably including an electric motor, speed reduction unit and a clutch, is provided for selectively rotating the main transfer drum 10 as a unit, i.e., both sectors 12 and 13 together, and for selectively rotating one of the segments 12, 13 with respect to the other. A second drive means 17, also preferably including an electric motor, a speed reduction unit and a clutch, is provided for rotating the intermediate transfer drum 15, when desired, in the same direction of rotation as the main drum 10 is rotated by its drive means. The peripheral surfaces of segments 12 and 13 correspond respectively to the inner and outer plies of a pair of plies to be built up on the breaker building drum 20, and the severing means 11 is adapted to cooperate with the segments 12 and 13 for severing he continuous strip into the respective strip portions directly on the peripheral surfaces of the latter segments.

Peripherally extending permanent magnet means (not shown) are preferably provided on each of the drums 10, 20 ad 15 for supporting thereon the magnetically attractable strip material R. The permanent magnet means on the periphery of building drum 20 as well as that on the periphery of the intermediate transfer drum 15 each exceed in strength the magnet means on the periphery of drum 10 so as to facilitate the required transfer of the severed strip portions, i.e., breaker plies, from the drum 10 onto the drums 15 and 20, respectively, while transfer of the alternate breaker plies from drum 15 to drum 20 is aided also by the tackiness of the outer surface of the inner breaker ply previously transferred to drum 20 directly from the drum 10.

A strip feed control arrangement 18 of known design and preferably including a dancer roll, is operatively connected in well known manner to the drive motor 6a of conveyor 6 for controlling the speed of the latter so as to maintain constant the amount of slack of the continuous strip R of breaker material being applied to the drum 10.

Integral with the frame 19 on which there is mounted the unit "C" but at a lower elevation than unit "C," there is also mounted a tread transfer unit "D." The tread transfer unit "D" is preferably of the type described in copending U.S. Pat. Application Ser. No. 740,209 filed June 26, 1968, by J. Leblond, now U.S. Pat. No. 3,547,286. The tread transporting arrangement there described includes a pair of horizontally extending endless chain conveyors 30a and 30b on which are supported the opposite ends of a plurality of horizontal tread supports 31. Loaded tread supports 31 each carrying an individual strip of tread material T are carried on the upper horizontal run of the conveyors 30a and 30b in the direction Y from the loading station X to the unloading station Z and return empty on the lower runs of the conveyors 30a, 30b. Means are provided at the tread-loading station X for loading the strips T onto the supports 31 and for moving the loaded supports onto the conveyors 30a 30b in a direction perpendicular to the direction Y, while means are provided at the unloading station Z of building drum 20 for successively moving the loaded supports 31 along median plane M–M (FIG. 2), i.e., parallel to the loading direction, onto a conveyor 32 which is vertically shiftable toward and into tangential contact with building drum 20. Conveyor 32 has a downstream free end portion 33 adapted to tangentially contact the drum 20 in response to raising of the conveyor 32. In each cycle of operation a loaded tread support 31 is shifted from its position on conveyors 30a, 30b, onto the conveyor 32 so as to position the strip of tread material T thereon in the unloading position Z preparatory to being applied around the breaker plies previously built up on drum 20.

The building drum 20 on which breaker-tread assemblies are built, constitutes one element of a tire carcass shaping and carcass-breaker-tread assembly unit "E," preferably of the type described in copending U.S. Pat. Application Ser. No. 717,786, filed on Apr. 1, 1968 by J. Leblond.

The unit "E" includes a transfer ring 40 which is coaxial with the drum 20 for transferring the breaker-tread assemblies formed on drum 20 to a carcass-shaping mechanism shown generally at S in FIG. 2. Shifting means (not shown) are provided for shifting the transfer ring 40 from a position in which ring 40 is in vertical alignment with the building drum 20 to a position in which the transfer ring 40 is in vertical alignment with a drum 41 of the shaping mechanism S.

MACHINE OPERATION

It will be seen that with the units "A," "B," "C," "D" and "E" situated, with respect to each other in the respective locations illustrated in FIGS. 1 and 2, a continuous strip R of breaker material may be fed from the supply unit "A," along conveyor 6, at a rate controlled by the device 18. The strip R then passes through centering unit "B" and onto the segmented drum 10. With the segmented drum 10 in its rearmost position, i.e., adjacent the severing means 21, the latter cuts the strip R along a path which is inclined to the median vertical plane M–M (FIG. 2) and which coincides with one transverse edge of one of the segments 12 or 13. Then, as the drum 10 is selectively rotated about its own axis and shifted between said rearmost position, said intermediate position, and said final position (FIG. 1) thereof, the intermediate transfer drum 15 meanwhile being shifted between said rest position thereof (FIG. 1) in which it is spaced both from the drum 20 and the drum 10, said intermediate position thereof in which it peripherally contacts the drum 10 and said end position thereof in which it peripherally contacts the drum 20, alternate ones of the severed strip portions on the drum 10 are transferred to the drum 15 while the remaining ones of the severed strip portions on the drum 10 are transferred directly from the drum 10, to the drum 20. Thereafter, the alternate strip portion on the drum 15 is transferred from the drum 15 onto the strip portion already on drum 20 so as to form thereon a pair of breaker plies of annular configuration with the cords of the inner one of the pair of breaker plies forming a crossing angle to the cords of the outer one of the pair of breaker plies.

With the pair of breaker plies thus assemblied on the drum 20, the apparatus is now ready for applying a strip of tread material T around the breaker ply assembly. This is accomplished by raising the conveyor 32, which is located below and thus does not interfere with the operation of the transfer drum 10, into tangential contact with the breaker ply assembly on drum 20 and driving the drum 20 in counterclockwise direction (FIG. 1) of rotation so as to wind the thusly applied strip of tread material T therearound. The synchronization of the units is such that a tread strip T will be in position on conveyor 32 when unit "C" completes its breaker-building cycle.

It will be seen that the tread supply unit "D" is located at a lower elevation than the breaker strip fabricating and transfer unit "C" and thus does not interfere with the operation of the latter. A strip of tread material T may thus be applied by unit "D" to a breaker ply assembly on drum 20 while the unit "C" is beginning a new cycle of operation, including the severing on drum 10 of strip portions from the continuous strip material R and the transfer of an alternate one of such severed strip portions from drum 10 onto the intermediate drum 15. It will further be seen that during this same period of recycling of the unit "C," as well as during the period of application of the inner and outer breaker strip portions and of the tread strip T onto the drum 20, for assembling of a breaker-tread assembly thereon, a previously completed breaker-tread assembly may be positioned over and assembled to a first stage carcass positioned on the drum 41. Thus, many of the aforesaid operations may proceed simultaneously without interfering with one another. Of course, during axial shifting movement of the transfer ring 40 into and out of registry with the building drum 20, the transfer drum 10 must be either in its rear or in its intermediate position, the drum 15 must be either in the upper rest, or in its intermediate position, and the conveyor member 32 must be in a retracted position, i.e., out of contact with and spaced from the drum 20.

In order to accomplish the transfer, transfer ring 40 is provided with suitable means which are radially contractable into contact with the outer surface of a breaker-tread assembly on the building drum 20.

In building a tire, after a tread strip T is assembled about a completed breaker on building drum 20 the applicating conveyor 32 is retracted and ring 40 is shifted into position surrounding drum 20. Contractable means of the ring 40 is then moved radially inwardly into contact with the breaker-tread assembly and the building drum 20, which is also radially expansible and contractable, is radially contracted to transfer sole control over the breaker-tread assembly to the transfer ring 40. Thereafter, this ring is axially shifted toward the drum 41 and into vertical alignment with the median plane P—P of a first stage carcass mounted on the carcass bead-supporting end plates 41a,41b of the drum 41. Next, the sidewall shaping portions of the tire-shaping mechanisms comprising conical shaping rings 42 and 43, are moved toward the median plane P—P of the carcass. At this time the interior of the carcass on the drum 41 is inflated with fluid under pressure and the rings 42 and 43, together with the bead portions of the carcass, are axially moved closer to the median plane P—P to cause the first stage carcass to expand into contact both with the interior of the breaker-tread assembly carried in the transfer ring 40 and with the interior surfaces of the shaping rings 42 and 43. After the breaker-tread assembly and the carcass are in good adhering contact with one another and have been assembled together, the fluid pressure is released from the interior of the carcass, the shaping rings 42, 43 are moved axially away from the assembled carcass, the transfer ring 40 is expanded radially outwardly to free it from contact with the tread portion of the assembly, and the transfer ring is then shifted axially clear of the breaker-tread-carcass assembly. Thereafter, the breaker-tread-carcass assembly is removed from the machine and the machine is returned to the initial condition thereof ready to be recycled for the building of a new breaker-tread assembly and for the application of this new assembly to a new first stage carcass.

Preferably all of the drums 10, 20, 15 as well as the spools 4 and 5 are supported for rotation about parallel substantially horizontal axes. The axis of rotation U—U of drum 20 is fixed with respect to frame 19 and thus with respect to the location of severing means 11.

The application of the tread strips T to the breaker ply assembly on drum 20 is facilitated by arranging the shiftable conveyor portion 32 so as to be capable of exerting sufficient upward pressure against the drum 20 during the period of tread application to firmly adhere the tread strip T to the annular breaker ply assembly. Rotation of the drum 20 in counterclockwise direction as viewed in FIG. 1, during the time of application of such pressure by conveyor 32, results in the winding of the tread strip T about the annular breaker assembly located on drum 20. As previously noted, the tread supply unit "D" is cycled in such a manner that at the end of a cycle of building a breaker ply assembly on drum 20 there is positioned on the ramp 32 a loaded tread support 31. When the annular breaker is fully built up and the drums 10 and 15 are both out of the way, the ramp 32 is brought into its raised position and the leading end of a tread strip T is applied to the periphery of the drum 20 which, driven in rotation about its axis in turn drives the tread T from its support 31 which latter is then blocked, i.e., prevented from moving. Thus, the tread strip T slides from its support 31 and is wound up around the breaker plies to constitute the final breaker-tread assembly.

In their relative positions, as illustrated in FIGS. 1 and 2, the units "A" through "E" permit accessibility to the breaker supply unit "A," to the input end of the tread supply unit "D" and to the output end of the overall assembly unit "E" during the operation of the machine and without interfering with the overall machine cycle. The ready accessibility to the breaker supply station permits rapid interchange of a carriage 3 having a full breaker supply spool 4, with a carriage 3 whose breaker supply spool 4 has been depleted.

The apparatus according to the present invention requires a minimum of factory space while being capable of fully automatic operation. Furthermore the tire production rate is high since many of the operations are capable of being performed simultaneously rather than sequentially. In addition, the product uniformity is improved, as a result of reducing the number of possible misalignments in assembly of the tire components.

It will be understood by those skilled in the art that suitable conventional electrical and fluid circuits would be employed in the foregoing tire-building machine to automatically or manually regulate the various movements of the various parts within each of the units of the machine as well as to synchronize the operation of the various units of the machine with respect to one another.

While particular embodiments of this invention have been shown and described, it will be obvious to those skilled in the art that various changes and modifications may be made without departing from this invention it its broader aspects, and it is, therefore, intended in the appended claims to cover all such changes and modifications as fall within the true spirit and scope of this invention.

We claim:

1. A tire-buildng apparatus comprising in combination:
   supply means for supplying a continuous strip of bias-cut breaker material;
   severing mans for severing strip portions from said continuous strip of breaker material;
   a breaker-building drum supported for rotation at a given location spaced from said severing means, said breaker-building drum having a peripheral surface whose diameter is substantially equal to that of the finished tire;

breaker transfer means cooperating with said building drum at said given location for applying said severed strip portions thereto in such a manner as to form on the periphery thereof an annular breaker having at least one pair of plies and whose diameter is substantially equal to that of the finished tire, said breaker transfer means including a first transfer member in the form of a rotatably drum adapted to support successive ones of said severed strip portions on the surface thereof and to apply alternate ones of said strip portions to said building drum, said breaker transfer means further including orienting means adapted to cooperate with the remaining ones of said severed strip portions for changing the orientation of said remaining strip portions with respect to said alternate strip portions and for applying said remaining strip portions to said building drum so that the cords of one ply in each pair of breaker plies built up on said building drum form a crossing angle to the cords of the other of such pair of plies;

tread applicator means cooperating with said building drum for applying a strip of tread material therearound so as to form with said breaker plies an annular breaker-tread assembly whose diameter is substantially equal to that of the finished tire;

carcass support means spaced from said given location of said building drum an adapted to support thereon a tire carcass having a diameter which is smaller than said first mentioned diameter;

breaker-tread transfer means shiftable between said building drum and said carcass support means for shifting a completed breaker-tread assembly from said building drum to a position surrounding a carcass on said carcass support means; and means associated with said carcass support means for expanding a carcass supported thereon into contact with a breaker-tread assembly in position surrounding the carcass, for assembling together said carcass with said breaker-tread assembly.

2. The apparatus according to claim 1, wherein said breaker building drum is supported for rotation about a fixed, substantially horizontal, axis;

said breaker supply means is spaced from said building drum and adapted to supply the continuous strip of breaker material along a given path extending generally perpendicular to the axis of said building drum;

said severing means is located along said given path at a position horizontally spaced from said building drum;

and first transfer member 15 laterally shiftable between a pair of horizontally spaced positions adjacent said severing means and adjacent said building drum, respectively, said orienting means comprising a second transfer member for reversing the orientation of alternate ones of the severed strip portions.

3. The apparatus according to claim 2, wherein said tread applicator means comprises horizontally disposed conveyor means located at an elevation below said transfer means and below said building drum for conveying individual tire tread strips toward the underside of said building drum, said conveyor means including means for applying said tire tread strips to the periphery of said rotatable building drum when said first transfer member is in a position thereof spaced from said building drum.

4. The apparatus according to claim 1, further comprising strip centering means located along the path of said continuous strip of breaker material for maintaining said continuous strip of breaker material in registry with said transfer means and control means located along said path upstream of said transfer means for controlling the rate of feed of said continuous strip material to said transfer means.

5. The apparatus according to claim 1 wherein said building drum is radially expansible and contractable, said carcass support means being axially spaced from said building drum, and said breaker-tread transfer means comprising a radially expansible and contractable and axially movable transfer ring cooperable with said building drum, said breaker strips having a magnetically attractable material therein, and said building drum including means on the outer surface thereof for magnetically attracting said breaker strips to said drum.

6. The apparatus according to claim 1, in which said breaker transfer means and said tread applicator means move said severed strip portions and said strips of tread material, respectively, along paths which lie in the median circumferential plane of said building drum.

7. A tire-building apparatus comprising, in combination;

supply means for supplying a continuous strip of bias-cut breaker material;

severing means for severing strip portions from said continuous strip of breaker material;

a building drum supported for rotation at a given location spaced from said severing means;

breaker transfer means cooperating with said building drum at said given location for applying said severed strip portions thereto in such a manner as to form on the periphery thereof an annular breaker having at least one pair of plies;

tread applicator means cooperating with said building drum at said given location for applying a strip of tread material therearound so as to form an annular breaker-tread assembly thereon;

carcass support means spaced from said given location of said building drum and adapted to support a tire carcass;

breaker-tread transfer means shiftable between said given location of said building drum and said carcass support means for shifting a completed breaker-tread assembly from said building drum to a position surrounding a carcass on said carcass support means;

said breaker transfer means including a first transfer member in the form of a rotatable drum adapted to receive successive ones of said severed strip portions on the surface thereof, and means for shifting said rotatable drum between positions respectively adjacent said severing means and said building drum, said breaker transfer means further comprising a second transfer member shiftable between a position adjacent said rotatable drum and a position adjacent said building drum for changing the orientation of alternate ones of said strip portions so that they are oriented oppositely with respect to the remaining strip portions and for applying said oppositely-oriented alternate strip portions to said building drum; and means associated with said carcass support means for assembling together said carcass with said breaker-tread assembly.

8. The apparatus according to claim 7, wherein said rotatable drum comprises at least a pair of segments adapted to receive successive ones of said severed strip portions on the respective surfaces thereof, shifting means being adapted to shift said segmented drum generally horizontally and said apparatus further comprising means for shifting said second transfer member in generally vertical direction.

9. The apparatus according to claim 7, wherein said building drum is rotated in a given direction of rotation by said drum for applying the first of a pair of breaker plies thereto, and is rotated also in said given direction of rotation by said second transfer member for applying the second of such pair of breaker plies thereto, said apparatus further comprising a drive means associated with said building drum for rotating the latter in said given direction of rotation for winding the tire tread thereon.

10. A tire-building apparatus comprising, in combination:

supply means for supplying a continuous strip of bias-cut breaker material;

severing means for severing strip portions from said continuous strip of breaker material;

a breaker building drum supported for rotation at a given location spaced from said severing means;

breaker transfer means cooperating with said building drum at said given location for applying said severed strip portions thereto in such a manner as to form on the periphery thereof an annular breaker having at least one pair of plies, said breaker transfer means including a segmented drum positioned intermediate said severing means and said breaker building drum and rotatable about an axis parallel to the axis of rotation of said breaker building drum, said segmented drum being shiftable laterally between positions adjacent said severing means and said building drum, respectively, for transferring severed strip portions to the latter;

tread applicator means cooperating with said building drum at said given location for applying a strip of tread material therearound so as to form an annular breaker-tread assembly thereon;

carcass support means spaced from said given location of said building drum and adapted to support a tire carcass;

breaker-tread transfer means shiftable between said given location of said building drum and said carcass support means for shifting a completed breaker-tread assembly from said building drum to a position surrounding a carcass on said carcass support means; and means associated with said carcass support means for assembling together said carcass with said breaker-tread assembly.

11. The apparatus according to claim 10, wherein said building drum is supported for rotation about a fixed first horizontal axis, said breaker supply means including a supply spool rotatable about a second axis parallel to said first axis and including conveyor means for supplying the continuous strip of breaker material along a given path extending generally towards said building drum; said segmented drum being second axes, said tread applicator means including conveyor means located at a level below said segmented and said building drums for conveying individual tire threads to said building drum and comprising means for applying said treads upwardly onto the periphery of said building drum, and said severing means cooperating with said segmented drum for severing the strip material thereon.

PO-1050
(5/69)

UNITED STATES PATENT OFFICE
CERTIFICATE OF CORRECTION

Patent No. 3,607,555   Dated September 21, 1971

Inventor(s) Jean Le Blond et al.

It is certified that error appears in the above-identified patent and that said Letters Patent are hereby corrected as shown below:

Column 6, line 70 "mans" should be --means--.

Column 7, line 7 "rotatably" should be --rotatable--.

Column 7, line 50 "15" should be --is--.

Claim 11, column 10, line 13, after "being" insert --rotatable about a third axis parallel to said first and--.

Signed and sealed this 19th day of September 1972.

(SEAL)
Attest:

EDWARD M. FLETCHER, JR.
Attesting Officer

ROBERT GOTTSCHALK
Commissioner of Patents